United States Patent
Chou (10) Patent No.: US 10,491,077 B2
(45) Date of Patent: *Nov. 26, 2019

(54) MOTOR STRUCTURE CAPABLE OF DISSIPATING HEAT THEREIN

(71) Applicant: Wen-San Chou, Tainan (TW)

(72) Inventor: Wen-San Chou, Tainan (TW)

( * ) Notice: Subject to any disclaimer, the term of this patent is extended or adjusted under 35 U.S.C. 154(b) by 345 days.

This patent is subject to a terminal disclaimer.

(21) Appl. No.: 15/294,514

(22) Filed: Oct. 14, 2016

(65) Prior Publication Data

US 2017/0110938 A1  Apr. 20, 2017

(30) Foreign Application Priority Data

Oct. 20, 2015 (TW) .............................. 104134294 A (51) Int. Cl.
| | |
|---|---|
| *H02K 9/00* | (2006.01) |
| *H02K 9/06* | (2006.01) |
| *H02K 5/20* | (2006.01) |
| *H02K 9/14* | (2006.01) |
| *F04D 19/00* | (2006.01) |
| *F04D 29/58* | (2006.01) |
| *H02K 5/22* | (2006.01) |
| *H02K 5/15* | (2006.01) |

(52) U.S. Cl.
CPC ............ *H02K 9/06* (2013.01); *F04D 19/002* (2013.01); *F04D 29/5806* (2013.01); *H02K 5/20* (2013.01); *H02K 9/14* (2013.01); *H02K 5/15* (2013.01); *H02K 5/225* (2013.01)

(58) Field of Classification Search
CPC .. H02K 9/06; H02K 5/20; H02K 9/14; H02K 5/15; H02K 5/225; F04D 19/002; F04D 29/5806
USPC ........................................................ 310/60 R
See application file for complete search history.

(56) References Cited

U.S. PATENT DOCUMENTS

| | | | | |
|---|---|---|---|---|
| 4,406,959 | A * | 9/1983 | Harano ..................... | H02K 9/20 165/104.25 |
| 2009/0026859 | A1* | 1/2009 | Kinoshita .............. | H02K 3/522 310/71 |
| 2009/0224617 | A1* | 9/2009 | Bottger .................. | H02K 1/146 310/89 |

FOREIGN PATENT DOCUMENTS

DE  3710622 A1 * 10/1988  ............... H02K 5/20

* cited by examiner

*Primary Examiner* — Jianchun Qin (57) ABSTRACT

A motor structure includes a housing, a cover, an air collecting structure fixed to the cover, and a cooling fan. The cover defines a plurality of inlet holes. The air collecting structure defines a plurality of through holes aligned with the inlet holes of the cover, so as to provide a path for allowing a central portion of the air current generated by the cooling fan to enter the housing. The housing defines a plurality of communication holes and a plurality of outlet holes for allowing the air which has entered the housing to flow thereout. In addition, the present invention provides another path so that an outer portion of the air current can flow along the outer surface of the housing to reduce the temperature of the housing.

5 Claims, 8 Drawing Sheets

MOTOR STRUCTURE CAPABLE OF DISSIPATING HEAT THEREIN

TECHNICAL FIELD OF THE INVENTION

The present invention relates to a motor structure capable of dissipating heat therein and, more particularly, to a motor which can effectively dissipate the heat generated in its housing through multiple paths, so that heat is not easy to accumulate in the motor's housing; thus, maximum power output of the motor can be achieved, and the performance and service life of the motor can be increased.

DESCRIPTION OF THE PRIOR ART

In today's industry, motors are one of commonly used devices for providing mechanical power. However, while a motor is running, heat is easy to accumulate in the motor's housing. If the heat is not timely dissipated, the magnetic field provided by the magnets in the motor's housing will decrease, so that the performance of the motor can be gradually reduced. Besides, when the temperature in the motor rises to a certain level, the coils or enamel wires in the motor can be damaged, and this may cause a short circuit, and thus the motor may burn out. For preventing such a problem, a motor is usually provided with a cooling fan. However, the air current generated by the cooling fan of the motor can only flow along the outer surface of the motor's housing, but cannot flow into the interior of the motor, and thus the capacity of dissipating the heat generated in the motor is limited. The problem of heat accumulation in the motor's housing has not yet been solved completely.

SUMMARY OF THE INVENTION

One object of the present invention is to provide a motor, which can effectively dissipate the heat generated in its housing through multiple paths.

According to one feature of the present invention, the motor generally includes a housing, a cover, an air collecting structure, a rotating shaft, and a cooling fan. The housing has a surrounding wall defining therein an inner space with a front opening and has a rear closure wall opposite to the front opening. The rear closure wall defines a central hole and a plurality of outlet holes. The cover, which closes the front opening of the housing, has a central hub defining a central hole and defines a plurality of inlet holes around the central hub thereof. The air collecting structure, which is adapted to be fixed to the cover, has a central hub defining a central hole aligned with the central hole of the cover for allowing the rotating shaft to insert therethrough and has an outer ring around the central hub of the air collecting structure and defines a plurality of through holes, located between the outer ring and the central hub of the air collecting structure and aligned with the inlet holes of the cover, whereby a central portion of a whirling, ongoing air current generated by the cooling fan can flow through the space between the outer ring and the central hub of the air collecting structure and then flow through the through holes of the air collecting structure and the inlet holes of the cover to enter the inner space of the housing and finally flow out of the housing via the outlet holes for dissipating the heat generated in the housing.

According to another feature of the present invention, the housing defines at least one communication hole at its surrounding wall, so that the air current having entered the inner space of the housing may flow out of the housing via the communication hole in addition to the outlet holes of the housing to take away the heat generated in the housing.

According to one advantage of the present invention, the motor can be used in a high-temperature environment without being damaged. In a test, the motor was continuously operated in a closed space of 70 degrees C. for a long time without burning out.

Other objects, advantages, and novel features of the present invention will become more apparent from the following detailed description when taken in conjunction with the accompanying drawings.

DETAILED DESCRIPTION OF THE PREFERRED EMBODIMENTS

Since the structure and operational principles of a motor have been known widely, a detailed description for the constituent parts thereof is not provided in the following paragraphs.

Figure 1:
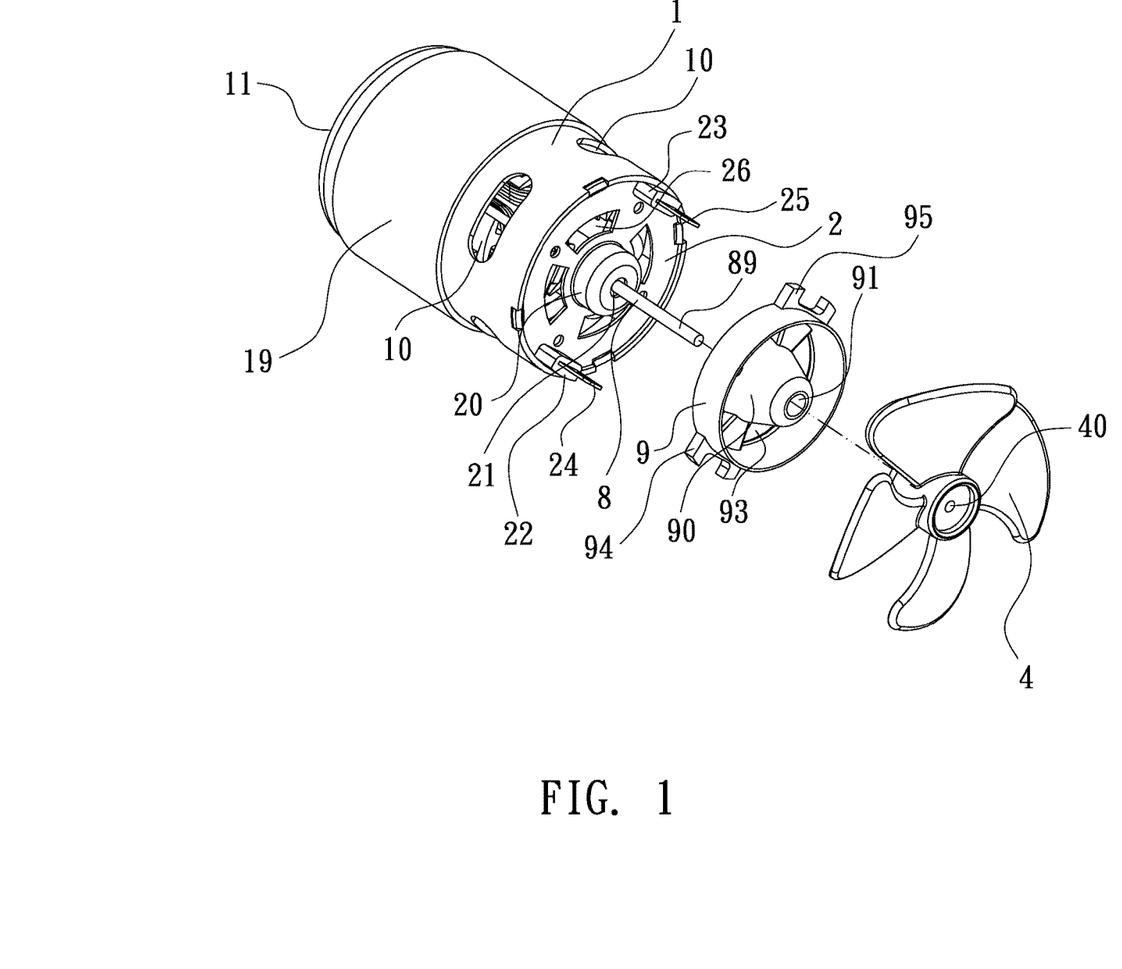
FIG. 1 shows an exploded view of a motor according to one embodiment of the present invention.
Figure 2:
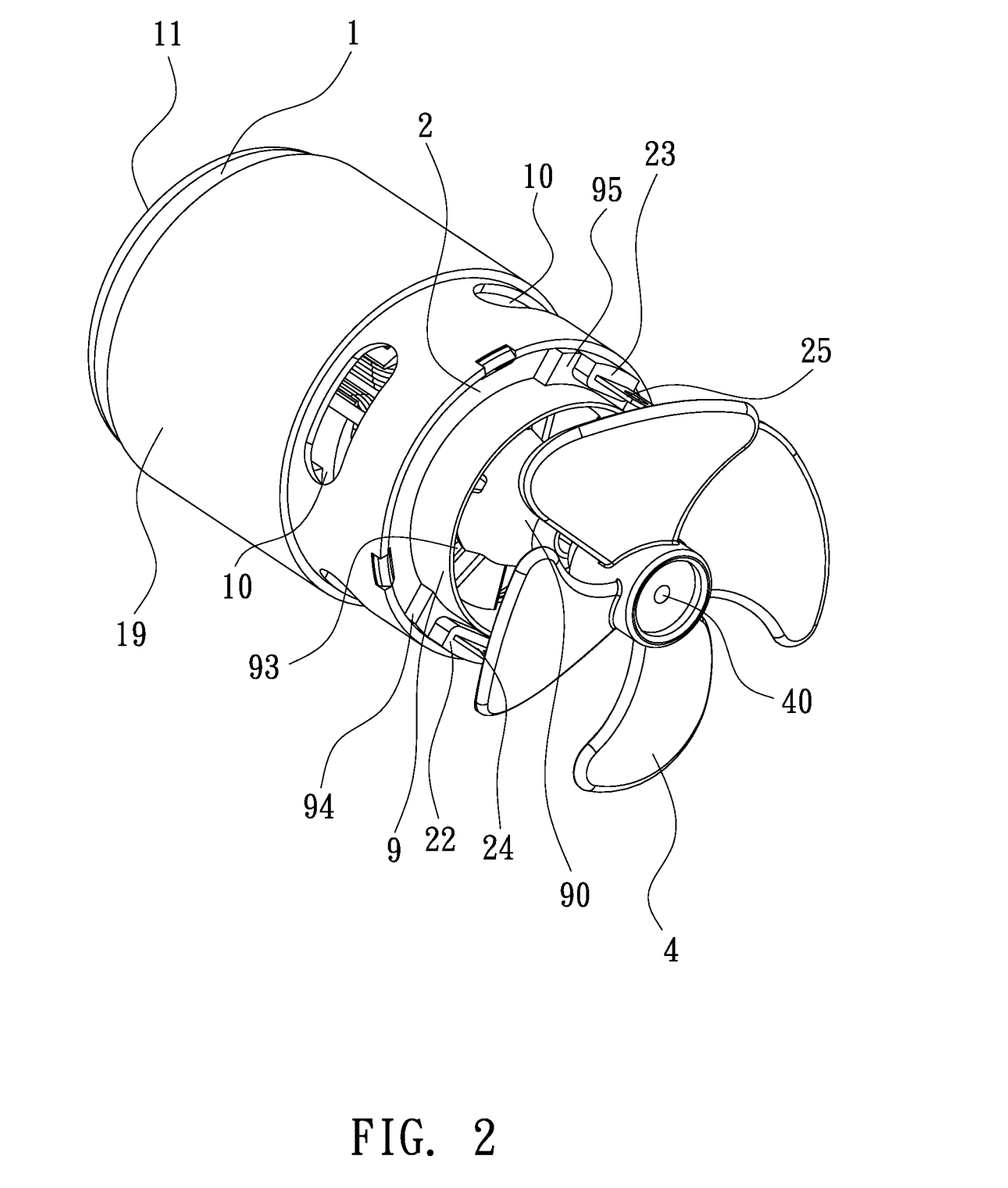
FIG. 2 shows a 3-dimensional view of the motor.
Figure 3:
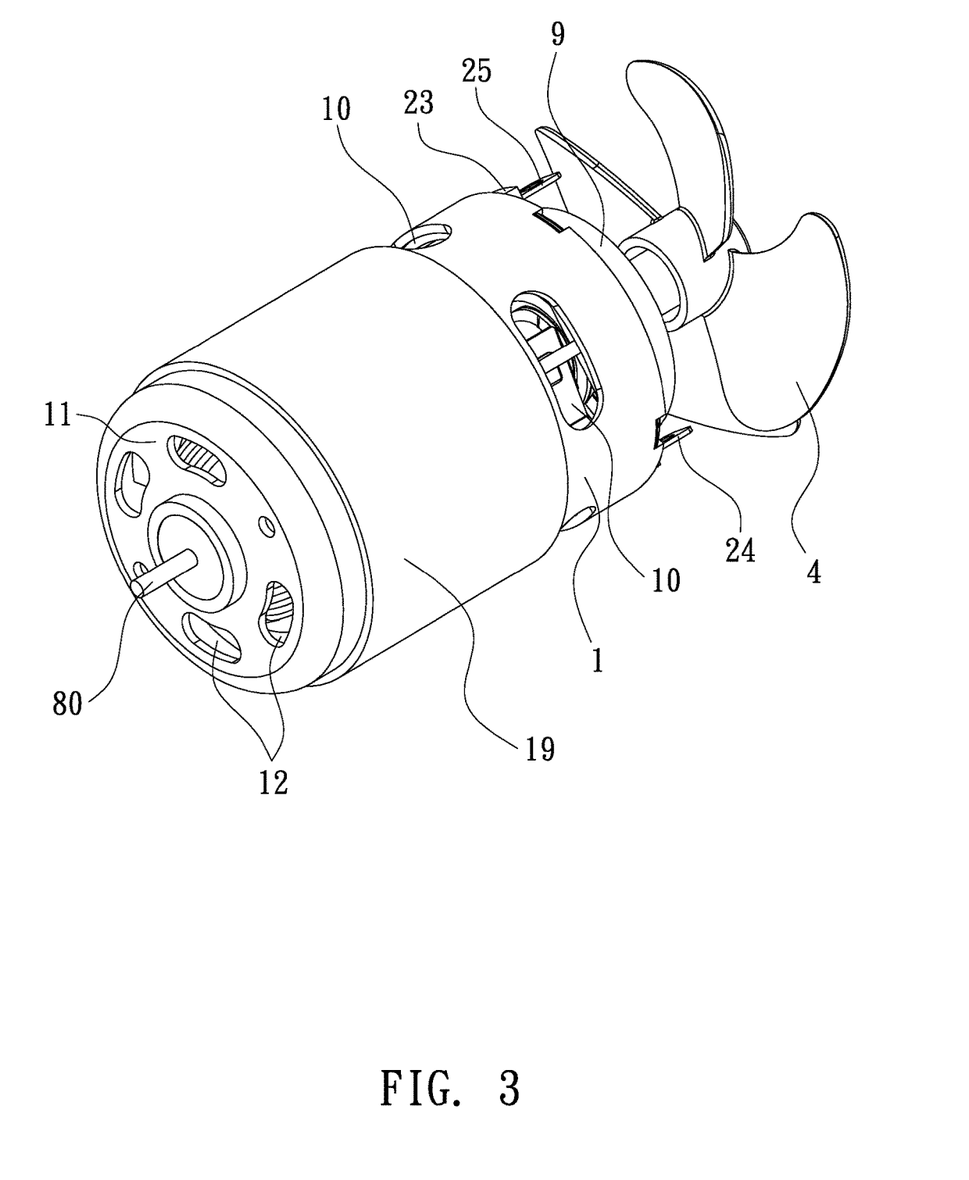
FIG. 3 shows another 3-diemensional view of the motor, which is viewed from a different angle than FIG. 2.
Figure 6:
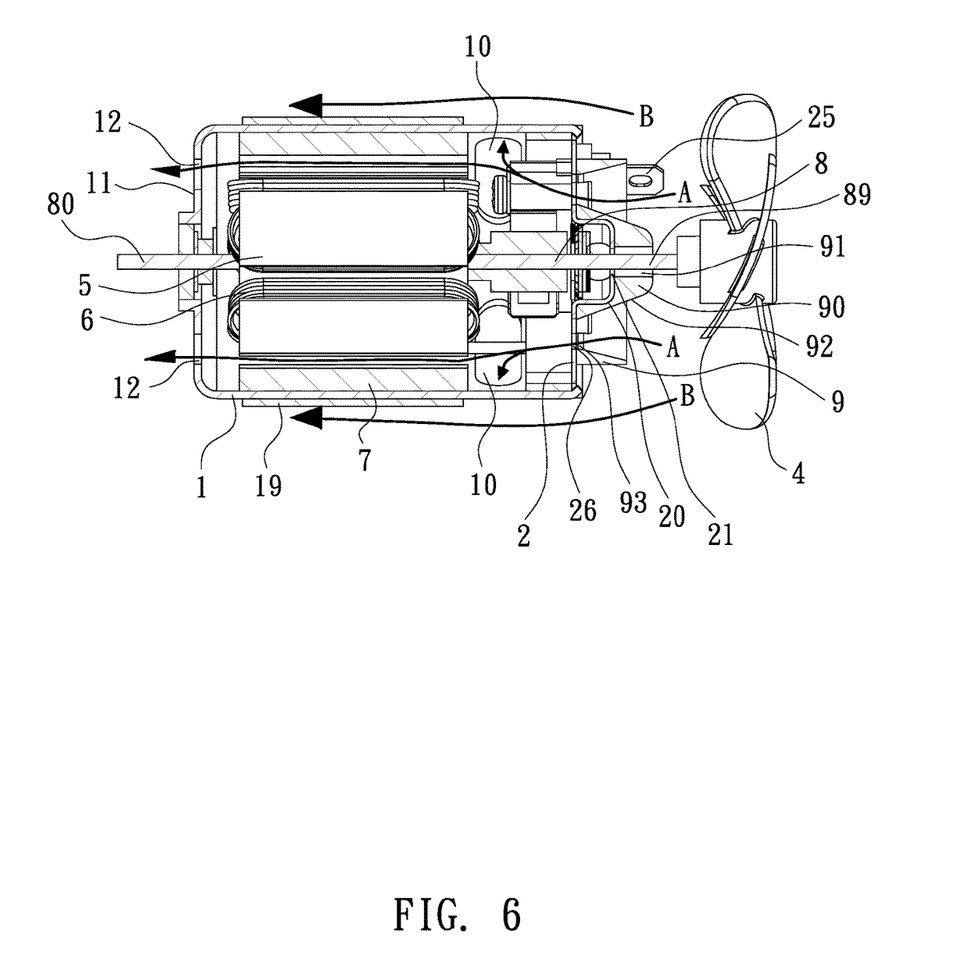
FIG. 6 shows a sectional view of the motor taken along line A-A in FIG. 5, wherein some of the air current, which follows the airflow path (A) to enter the motor's housing for dissipating the heat generated in the motor, and some of the air current, which follows the airflow path (B) to cool down the motor's housing for dissipating the heat generated in the motor, are manifested.

Referring first to FIGS. 1 through 3, a motor according to one embodiment of the present invention is shown, which generally includes a cylindrical housing 1, a cover 2, an air collecting structure 9, a rotating shaft 8, and a cooling fan 4. The housing 1 has a surrounding wall, which defines therein an inner space with a front opening, and has a rear closure wall 11 opposite to the front opening. The rear closure wall 11 defines a central hole, in which a bearing may be mounted, and a plurality of outlet holes 12 around the central hole. The surrounding wall of the housing 1 defines a plurality of communication holes 10, through which the air within the housing 1 may flow into ambient environment. Furthermore, a rotor 5, coils 6 and magnets 7, which are necessary elements for a motor, are provided in the housing 1 (see FIG. 6). The rotating shaft 8 is mounted across the inner space of the housing 1, wherein the rotating shaft 8 has a first end 80 which is inserted through the central hole of the rear closure wall 11 for connecting with a transmission mechanism (not shown) for providing necessary mechanical power. The rotating shaft 8 has a second end 89 which is inserted out of the front opening of the housing 1 to be fitted with the cooling fan 4, as will be further illustrated below.

A magnetically permeable sleeve 19, which can be made of metal, is closely fitted around the outer surface of the surrounding wall of the housing 1, to increase the performance of the motor.

Figure 4:
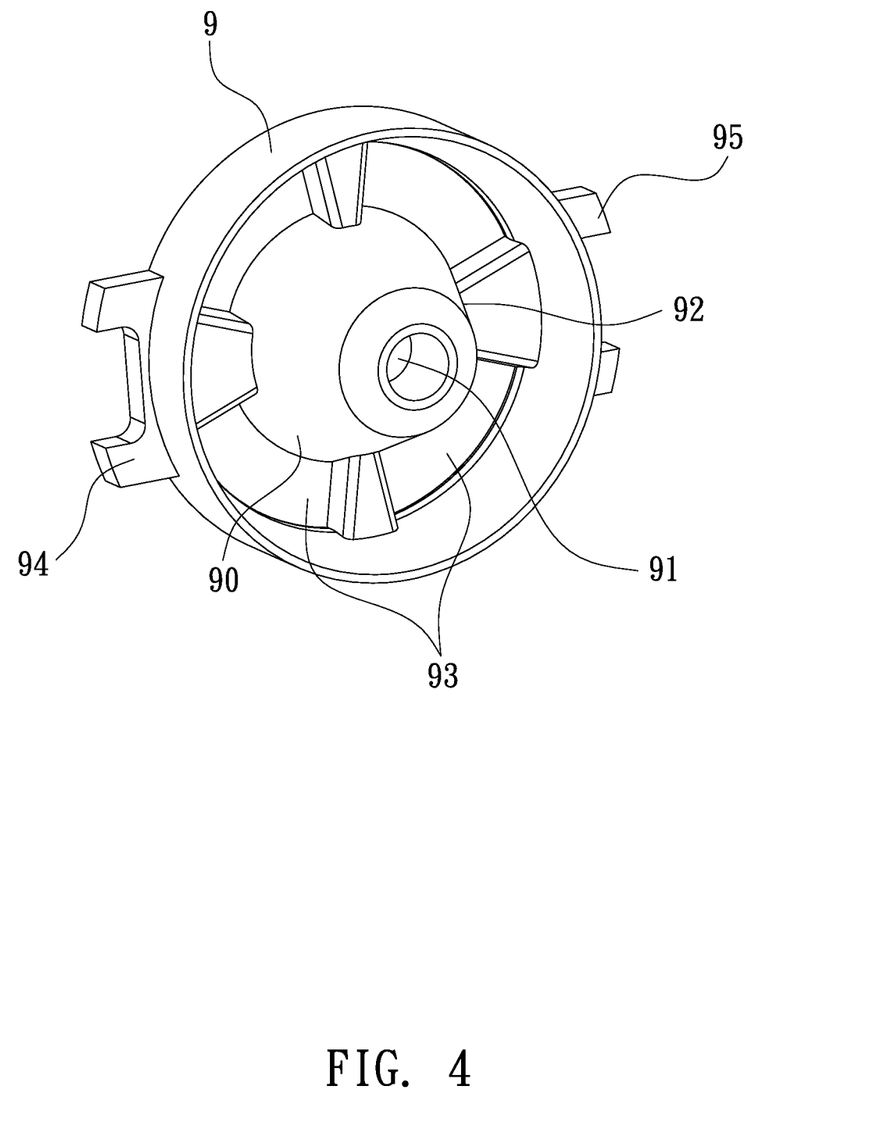
FIG. 4 shows an air collecting structure, which can be fixed to a cover used in the motor.

The cover 2, which is substantially disk-shaped and closes the front opening of the housing 1, has a central hub 20 defining a central hole 21 and defines a plurality of inlet holes 26 around the central hub 20. The cover 2 is engaged with two sheaths 22, 23 provided at the housing 1, so that the cover 2 is installed to the housing 1 and closes the front opening of the housing 1. Furthermore, two electrical terminal blades 24, 25 provided at the housing 1 are inserted through the two sheaths 22, 23 to facilitate electrical connection for the motor. In this embodiment, the air collecting structure 9 is provided with two U-shaped members 94, 95, capable of engaging with the two sheaths 22, 23 extending out of the cover 2, so that the air collecting structure 9 can be fixed to the cover 2. Also, the air collecting structure 9 has a central hub 90, which can be aligned with the central hub 20 of the cover 2, and an outer ring around the central hub 90 and defines a plurality of through holes 93, located between the outer ring and the central hub 90 and aligned with the inlet holes 26 of the cover 2, wherein the central hub 90 has a conical surface 92, and defines a central hole 91 for allowing the second end 89 of the rotating shaft 8 to insert therethrough. The central hub 90 tapers off from its round base which is formed integrally with other portions of the air collecting structure 9; namely, the diameter of a cross section of the central hub 90 is gradually reduced as compared to the round base of the central hub 90. While the cover 2 is being installed to the housing 1, the second end 89 of the rotating shaft 8 can be inserted through the central hole 21 of the cover 2 and the central hole 91 of the air collecting structure 9, wherein a bearing (not shown) may be provided in the central hub 20 of the cover 2 and fitted with the rotating shaft 8.

As shown in FIG. 1, the cooling fan 4 defines a central hole 40, into which the second end 89 of the rotating shaft 8 extending out of the central hole 21 of the cover 2 and the central hole 91 of the air collecting structure 9 can be fitted, so that the cooling fan 4 is attached to and rotated together with the rotating shaft 8.

Figure 5:
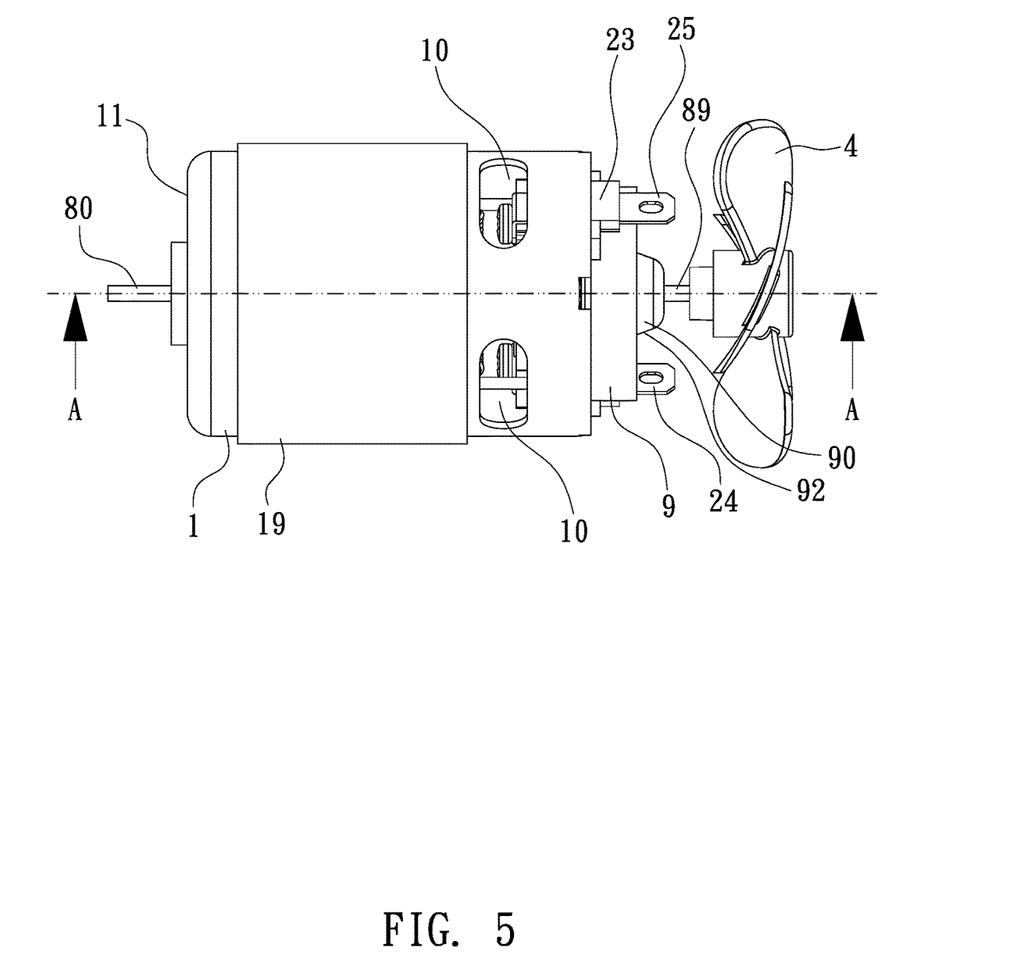
FIG. 5 shows a side view of the motor.
Figure 7:
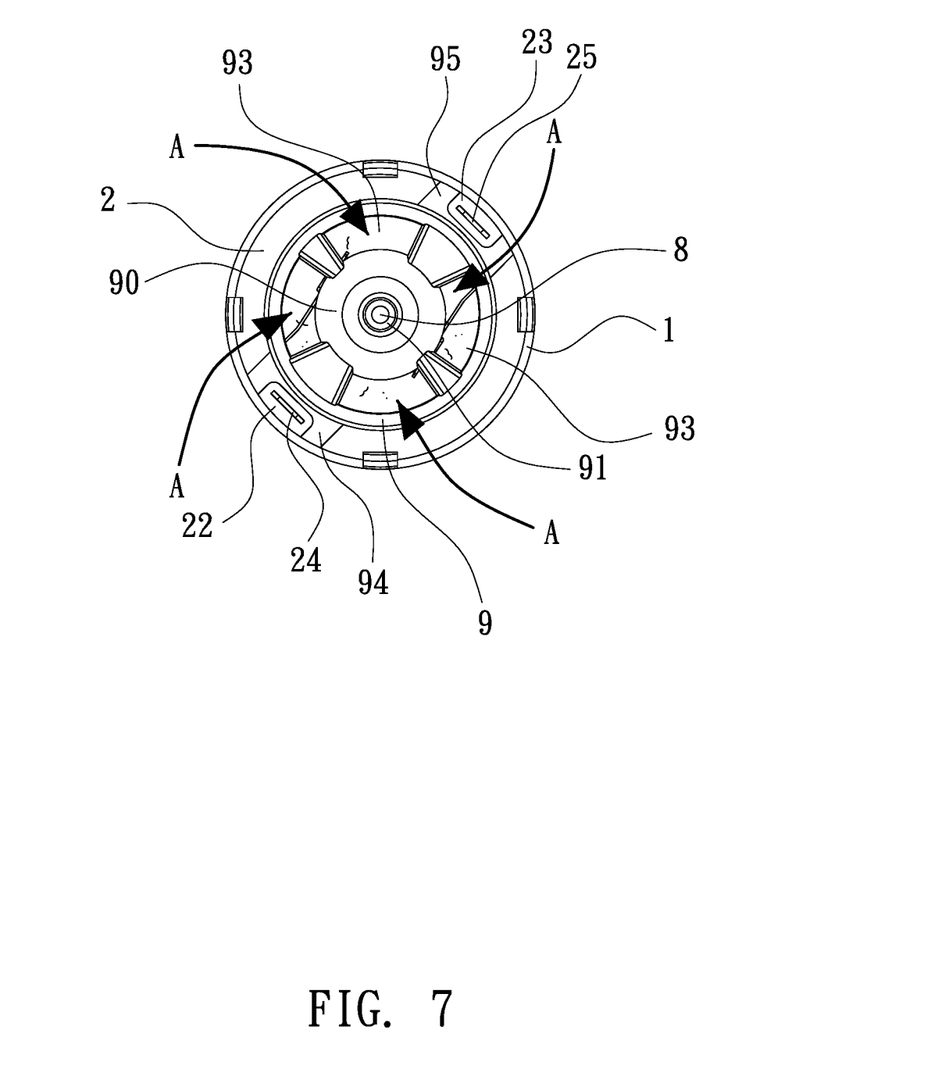
FIG. 7 shows a front view of the motor, wherein some of the air current, which follows the airflow path (A) to enter the motor's housing for dissipating the heat generated in the motor, is manifested.
Figure 8:
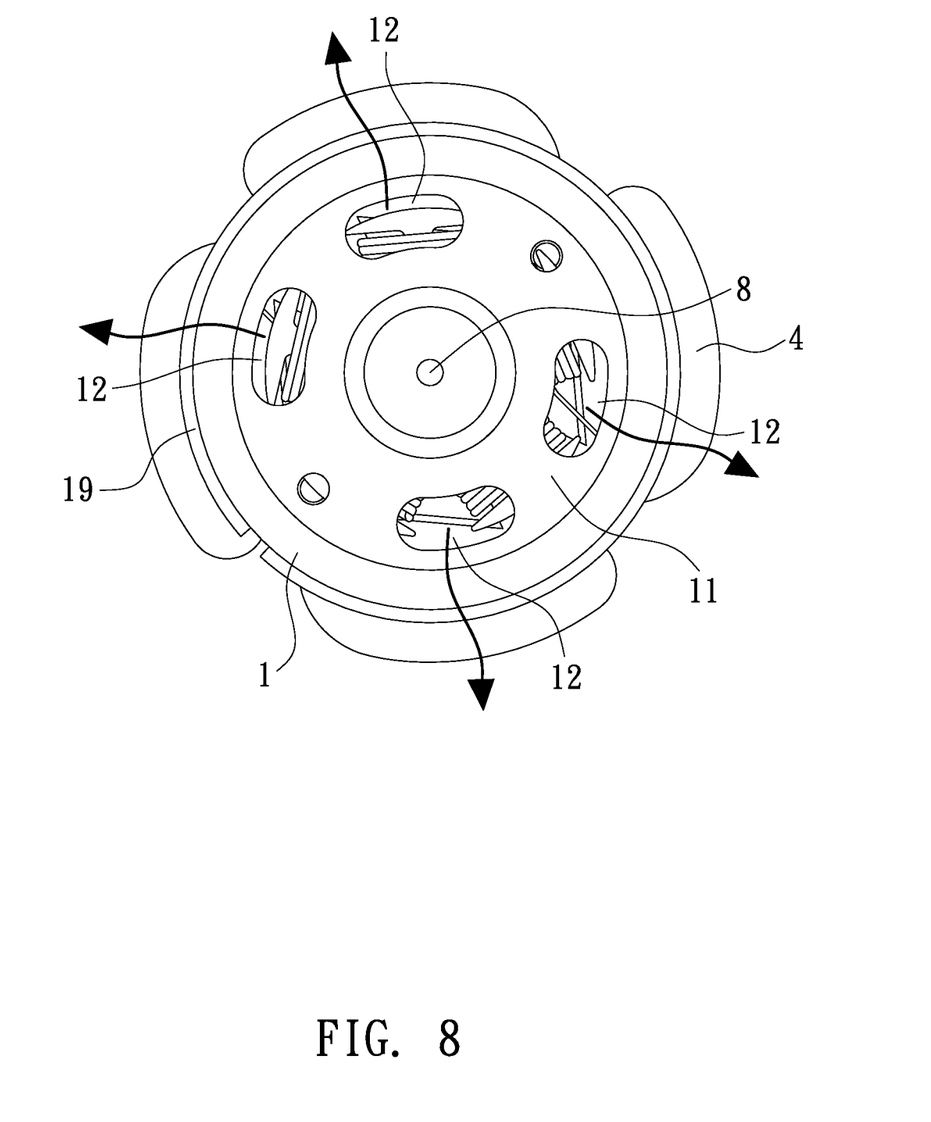
FIG. 8 shows a rear view of the motor, which demonstrates that the air current having entered the motor's housing may flow out of the housing via outlet holes to take away the heat generated in the housing.

FIGS. 2 and 3 show one embodiment of the motor, which is assembled from the housing 1, the cover 2, the air collecting structure 9, and the cooling fan 4. When the motor is started, the cooling fan 4 can be rotated together with the rotating shaft 8 to generate a whirling, ongoing air current towards the cover 2 and the air collecting structure 9, so that the air at the right side of the cooling fan 4 can be forced to flow into the left side of the cooling fan 4 (see FIG. 5). In particular, the air current can enter the inner space of the housing 1 easily, and the heat generated in the housing 1 can be dissipated effectively through multiple paths (see FIGS. 6 through 8). A central portion of the air current generated by the cooling fan 4 can be guided by the outer ring and the conical surface 92 of the air collecting structure 9 to smoothly flow through the space between the outer ring and the conical surface 92 of the air guiding structure 9, and then to pass through the associated holes 26, 93 to enter the inner space of the housing 1, as indicated by the airflow path (A) shown in FIGS. 6 and 7. In addition, an outer portion of the air current, which is outside the area of the outer ring of the air collecting structure 9, which does not enter the inner space of the housing 1, may flow along the outer surface of the housing 1 or the sleeve 19, as indicated by the airflow path (B) shown in FIG. 6, so that the housing 1 can be effectively cooled down to facilitate dissipation of the heat generated in the housing 1. In this embodiment, the air current which has entered the inner space of the housing 1 may flow out of the housing 1 via the outlet holes 12 and the communication holes 10 (see FIGS. 6 and 8), so that the heat generated in the housing 1 can be taken away with the leaving air current. The multiple airflow paths (A), (B) allow the heat generated in the housing 1 to dissipate more effectively, so that the motor can be prevented from burning out.

As a summary, the present invention employs the air collecting structure 9 fixed to the cover 2 to facilitate dissipating the heat generated in the housing 1 through multiple paths. The inlet holes 26 of the cover 2 and the through holes 93 of the air collecting structure 9 allow the motor of the present invention to provide an airflow path (A) via which a central portion of the air current generated by the cooling fan 4 enters the inner space of the housing 1 to dissipate the heat generated in the housing 1. In addition, the present invention provides another airflow path (B) via which an outer portion of the air current, which does not enter the inner space of the housing, flows along the outer surface of the housing 1 to lower the temperature of the housing 1 and thus to increase the capacity of dissipating the heat generated in the housing 1. Through multiple paths for heat dissipation, heat is not easy to accumulate in the housing 1 of the motor; therefore, maximum power output of the motor can be achieved, and thus the performance and service life of the motor can be increased. Even though the motor is operated in a high-temperature environment, it will not burn out. These features render the motor of the present invention useful and inventive.

I claim:

1. In a motor including a housing, a cover, a rotating shaft, and a cooling fan, wherein the housing has a surrounding wall defining therein an inner space with a front opening and has a rear closure wall opposite to the front opening, the rear closure wall defining a first central hole and a plurality of outlet holes; the cover, which is substantially disk-shaped and closes the front opening of the housing, has a first central hub defining a second central hole; the rotating shaft is mounted across the inner space of the housing, the rotating shaft having a first end which is inserted through the first central hole of the rear closure wall and having a second end which is inserted through the second central hole of the cover; the cooling fan is fixed to the second end of the rotating shaft, so that the cooling fan is rotated together with the rotating shaft; wherein the motor is characterized in that:

the cover defines a plurality of inlet holes around the first central hub; an air collecting structure, which is adapted to be fixed to the cover, has a second central hub defining a third central hole aligned with the second central hole of the cover for allowing the second end of the rotating shaft to insert therethrough and has an outer ring around the second central hub of the air collecting structure and defines a plurality of through holes, located between the outer ring and the second central hub of the air collecting structure and aligned with the inlet holes of the cover, wherein the second central hub of the air collecting structure has a conical surface and tapers off from a round base thereof which is formed integrally with the air collecting structure, whereby a central portion of a whirling, ongoing air current generated by the cooling fan is configures to flow through the space between the outer ring and the second central hub of the air collecting structure and then flow through the through holes of the air collecting structure and the inlet holes of the cover to enter the inner space of the housing and finally flow out of the housing via the outlet holes for dissipating the heat generated in the housing.

2. The motor of claim 1, wherein the housing defines at least one communication hole at its surrounding wall, so that the air current having entered the inner space of the housing is configured to flow out of the housing via the communication hole to take away the heat generated in the housing.

3. The motor of claim 1, wherein the cover is engaged with two sheaths provided at the housing so that the cover is installed to the housing and closes the front opening of the housing; two electrical terminal blades provided at the housing are inserted through the two sheaths to facilitate electrical connection for the motor.

4. The motor of claim 3, wherein the air collecting structure is provided with two U-shaped members capable of engaging with the two sheaths, so that the air collecting structure is fixed to the cover.

5. The motor of claim 1, wherein a sleeve made of a magnetically permeable metal is closely fitted around the surrounding wall of the housing to increase the performance of the motor.

* * * * *